United States Patent [19]

Day et al.

[11] Patent Number: 4,724,516

[45] Date of Patent: Feb. 9, 1988

[54] METHOD AND APPARATUS FOR SETTING ANALOG COMMAND SIGNALS BY CHANGE SIGNALS OF VARIABLE DURATION

[75] Inventors: Donald W. Day, Machesney Park, Ill.; John C. Wetter, Beloit, Wis.; Paul H. Brace, Rockford; Lary L. Fields, Caledonia, both of Wis.

[73] Assignee: Barber-Colman Company, Rockford, Ill.

[21] Appl. No.: 810,402

[22] Filed: Dec. 18, 1985

[51] Int. Cl.$^4$ .................... G06F 15/46; G05B 11/28
[52] U.S. Cl. .................... 364/130; 318/599; 364/166; 364/829
[58] Field of Search ............... 364/148, 130, 829, 835, 364/605, 166; 318/596, 599; 328/27, 34, 58, 74; 307/234, 261, 265, 519; 340/347 NT

[56] References Cited

U.S. PATENT DOCUMENTS

| | | | |
|---|---|---|---|
| 3,256,426 | 6/1966 | Roth et al. ........................ | 364/829 |
| 3,456,099 | 7/1969 | Grindle et al. .................. | 364/829 X |
| 3,710,086 | 1/1973 | Lahoe et al. ..................... | 318/599 X |
| 3,895,280 | 7/1975 | Peterson ........................ | 318/599 X |
| 3,947,738 | 3/1976 | Oliver ............................ | 318/599 X |
| 4,236,106 | 11/1980 | Davis et al. ................... | 318/599 |

Primary Examiner—Joseph Ruggiero

[57] ABSTRACT

Method and apparatus by which continuously existing analog voltage command signals for various channels within a control system are changed by determined amounts and senses as a result of supplying "pulse" signals of different durations and polarities. Electronic integrators preferably operating to create linear slope changes in their outputs, and to hold their outputs steady absent any input, are receptive to the change signals ("pulses") of differing durations to create analog command signals which change by increments proportional to the time duration and in a direction corresponding to the polarity of the change signal. This permits computer control of servo devices requiring continuously-existing, changeable command signals in the same fashion as servo devices which respond directly to variable duration, pulse-type change signals.

11 Claims, 3 Drawing Figures

METHOD AND APPARATUS FOR SETTING ANALOG COMMAND SIGNALS BY CHANGE SIGNALS OF VARIABLE DURATION

BACKGROUND OF THE INVENTION

The present invention relates in general to condition control systems and, more particularly, to the changing and setting of analog voltage command signals, in response to change signals of variable duration, within such systems.

In many and diverse types of control systems, the condition to be controlled is affirmatively restored to a desired set point, whenever uncontrolled variables make it depart, by actuators which adjust final control elements (e.g., dampers, valves or heaters) to correctively influence the controlled condition. Each actuator is associated with or forms a part of an open or closed loop servo device which, in one way or another, must be told—by command signal intelligence—where its associated element should be positioned.

There are several classes of servo devices. Perhaps the most common class (here called Class I) are electrical and respond to the magnitude of a steady but settable dc. voltage or current to make the associated final element move to a corresponding position. Commonly, the required magnitude is determined, in response to sensed parameters, in a digital computer which is programmed to operate according to a predetermined algorithm. But the computer first arrives at and signals the required command magnitude numerically in digital form as a multi-bit binary word—and thus an associated digital-to-analog converter is required at a multi-bit output port of the computer for each servo device or "channel".

Another class of servo devices (here called Class II) responds to on-off "pulse" signals to change the position of the controlled element, with the amount of change being proportional to the time interval or duration during which a signal exists. For example, a pneumatic piston biased by a return spring is disposed in an air cylinder and connected to adjust a damper or valve (the final element). Air from a pressure source is admitted to the cylinder when a first solenoid valve is opened, but is bled to atmosphere when a second solenoid valve is opened. Each valve may be energized when an on-off signal from a corresponding single-bit computer output port exists. In this case, the computer algorithm is arranged to make the signal at one or the other of those ports "high" for a measured time interval when the element is to be moved in one direction or the other, the extent of movement being generally proportional to the time interval duration. The computer outputs a "high" signal at a given single-bit port for a computed time duration by following programming steps which constitute a timer loop.

In some prior arrangements of this sort, the servo device responds to a positive or negative polarity of a single on-off change signal to move the associated element in one direction or the other; the computer makes a polarity-selection port low or high during different alternating time spans; and the computer makes another single-bit output port high for a determined time duration within either of those spans. By relay logic or the like, the time duration signal is made of positive polarity when the first port signal is low but the second port signal is high. Conversely, the time duration signal is made of negative polarity when both such port signals are high. This permits the single-bit port for polarity selection to be shared by several "channels" respectively served by single-bit ports whose outputs are turned on for differing time durations when Class II servo devices are to be activated so that their actuators move their final elements by determined amounts and in desired directions.

It is often the case that the number and classes of servo devices required in a given control system is not known prior to the start of field installation. It may turn out that an insufficient quantity of one class of servo devices is on hand; and it may turn out that the computer at hand has an insufficient number of multi-bit output ports to accommodate the required quantity of Class I servo devices, recognizing that each of the latter requires a plurality of single-bit ports (say, eight) to output a binary digital number for each such device. And certainly, the digital-to-analog converter (DAC) normally required for each Class I servo device represents a considerable cost which is desirably to be avoided.

SUMMARY OF THE INVENTION

It is the general aim of the present invention to provide a method and apparatus for creating a settable analog command voltage (suitable as the input for a Class I servo device) from the time duration signals (normally directly usable by Class II servo devices) at single-bit output ports of a computer which forms a part of a control system.

A coordinate objective is to make the configuration of a control system flexible and inexpensive by making it possible to operate either Class I or Class II servo devices from single-bit output ports on which appear variable duration change signals; and thereby to eliminate the expense of multi-bit digital-to-analog converters.

And a related object is to economically increase the quantity of Class I servo device "channels" which can be driven or controlled by a system computer having a given, limited number of single-bit output ports, some of which otherwise would be used collectively (say in groups of eight) to normally represent a command in numerical, binary digital form.

Still another object is to permit the programming of a control algorithm within a control system computer to be based upon the same rationale (the creating of single-bit signals of computer-determined durations) when it is required that the final elements associated with either or both Class I and Class II servo devices be changed from one position to another.

It is a subsidiary object to change an analog command voltage in either an upward or a downward sense—and at the same rate or slope, which simplifies system computer programming—by causing the computer and associated output circuitry to supply an equal magnitude signal of either positive or negative polarity (relative to a reference) to an electronic integrator whose output in effect constitutes the normally constant but changeable command signal.

It is a further objective to alleviate wind-up of the voltage across the main capacitor within an electronic integrator, and the consequential delays of response which might otherwise occur within a control system which embodies and operates according to a preferred form of the invention.

These and other objectives and advantages will become apparent as the following description proceeds in conjunction with the accompanying drawings.

DETAILED DESCRIPTION OF THE PREFERRED EMBODIMENT

While the invention has been shown and will be described in some detail with reference to specific embodiments and method procedures which are preferred but are only examples, there is no intention thus to limit the invention to such details. On the contrary, it is intended here to cover all modifications, alternatives and equivalents which fall within the spirit and scope of the appended claims.

Figure 1:
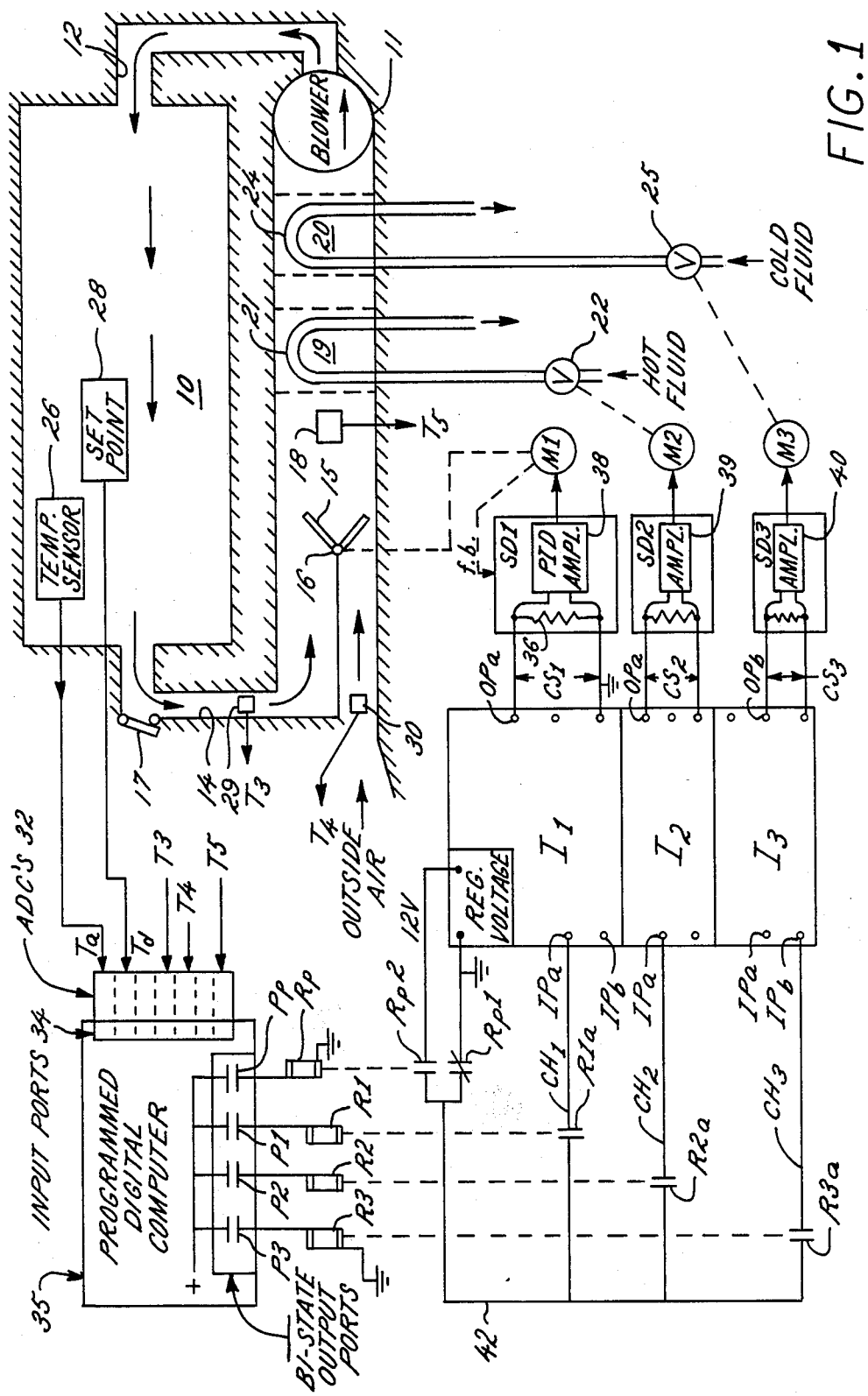
FIG. 1 is a schematic block diagram of a simple but typical control system which embodies, and which carries out the method of, the present invention.

The control system appearing in FIG. 1 is intended to maintain the temperature of air slowly circulated through an office or residential room 10 by heating and cooling apparatus. As the number of human beings in the office changes to alter contributions of body heat, or as different numbers of electric lamps for illumination are turned on or off to change heat contribution from such lamps, or as outside air varies in temperature and thus changes the heat transmission rate (losses) through the office walls or windows, the temperature within the space 10 may rise or fall above or below the desired set point. The heating and cooling apparatus acts to decrease or increase the temperature of entering air until it matches the set point.

As represented diagrammatically, a blower 11 continuously circulates a slow flow of air through an entry duct 12, such air passing through the office space to end up as return air flowing through a return duct 14. The return air is mixed with a variable proportion of outside air by a mixing damper 15 mounted to swing about a pivot point 16. A barometric exhaust damper 17 permits this outside air to be drawn in. When the damper 15 is moved counterclockwise to a new position, its vanes cause a greater proportion of outside air and a lesser proportion of return air to constitute the mixed air stream which the blower 11 pulls past a temperature sensor 18, through a heating zone 19, and through a cooling zone 20. For winter heating, hot fluid (e.g., from a boiler) is circulated through heat exchange coils 21 at a rate determined by the position (degree of opening) of a series valve 22. But for summer cooling, the hot fluid is shut off and cold fluid (e.g., from an air conditioning unit) is circulated through exchanger coils 24 disposed in the cooling zone, the rate of cooling fluid flow being determined by the position (degree of opening) of a series valve 25. Conventionally, during the winter heating mode and if the actual office temperature is below the set point, the damper 15 is repositioned in a clockwise direction to mix less cold outside air into the returning air stream, and/or the valve 24 is opened to raise the rate at which the heat is introduced into the flowing air stream. In the summer cooling mode and if the actual office temperature is below the set point, the damper 15 is repositioned in a counterclockwise direction to mix more warm outside air with the return air, and/or the valve 25 is repositioned more nearly toward its closed condition to decrease the rate at which cooling occurs within the zone 20. Of course, if the actual office temperature is above the set point, the corrective action or actions are opposite those described immediately above.

The damper 15, the valve 22, and the valve 25 are here called "final elements" since each has an influence on the temperature of air entering the office space 10 via the duct 12 and thus each affects the "controlled condition" which in this example is the temperature within the office 10. These three "final elements" are merely typical; many composite control systems will include a greater quantity, and different types, of final elements. In the present example, the actual temperature is represented by a signal Ta from any suitable sensing transducer, the illustrated temperature sensor 26 typically taking the form of a temperature-to-voltage converter. Any conventional set point signalling device 28 (e.g., a manually adjusted potentiometer for producing a settable dc. voltage) produces a set point signal Td which represents the desired temperature for the office. Other variables may be necessarily or desirably signaled and given different degrees of significance in determining the coordinated repositioning of the several final control elements so as to correct any error (when it arises) between the actual and desired office temperatures. For this purpose, sensors 29, 30 and the sensor 18 produce signals T3, T4 and T5 which respectively and proportionally represent temperatures of the return air, the outside air and the mixed air.

In a typical system, the signals Ta, Td, T3, T4, T5 are all fed via analog-to-digital converters (ADC's) 32 to inport ports 34 of a programmed digital computer 35. As is known in the art, the computer iteratively executes, with a rapid repetition rate, a programmed algorithm which determines when, by how much, and in which sense, each of the final control elements (exemplified at 15, 22, 25) should be repositioned in order to remove any difference (error) between the desired and actual temperatures represented by the signals Td and Ts. As mentioned above, the computer may have multi-bit output ports each producing a binary numerical word which is fed through a DAC to produce a continuously-existing analog voltage signal constituting the command signal to a Class I servo device which positions the associated final element. If such were utilized in FIG. 1, DAC's would feed adjustable voltages to the input terminals of Class I servo devices SD1, SD2 and SD3 which respectively include electric motors M1, M2, M3 mechanically connected to the damper 15, the valve 22, and the valve 25. It may be observed in passing that the computer 35 may have a limited number of output ports (say, sixty-four single-bit terminals) and if eight bits are employed to signal a variable output number, then only eight "channels" would be available to furnish (via DAC's) dc. voltage analog command signals to eight servo devices of the sort exemplified by SD1, SD2 and SD3.

The servo devices SD1, SD2, SD3 are, in effect, transducers which convert the input command analog signals to corresponding positions of the associated final elements. In a more general sense, such servo devices are utilization devices which respectively respond to and utilize the command signals $CS_1$ through $CS_3$. The servo device SD1, for example, has an input resistance 36 to which the command signal voltage $CS_1$ is applied. It includes a summing amplifier 38 whose output voltage energizes the motor M1 mechanically connected to the damper 15. It further includes a feedback path from the motor output to create an "actual damper position signal". The summing amplifier energizes the motor to move the damper in one direction or the other until the error between the command signal $CS_1$ and the feedback signal is reduced to zero. The servo device SD1 is typical of Class I devices which operate on a closed loop principle to keep the position of the final element (damper 15) in agreement with the magnitude of the adjustable or settable analog command signal $CS_1$.

The servo devices SD2, SD3 may, for example, be Class I utilization devices of the open loop type. They include torque motors here designated M2 and M3 coupled to mechanically position the valves 22 and 25, respectively. Those torque motors are associated with return springs (not shown). Amplifiers 39 and 40 apply continuous voltages (which are proportional to the inputted analog command signals $CS_2$ and $CS_3$) to the respective motors M2 and M3, so that the angular positions of the motors and their associated valves become proportional to the command magnitudes. No feedback is utilized, and it is rationally assumed that the torque of each motor is linearly proportional to the applied command, and that the return springs result in angular positions (from some reference point) which are directly proportional to the command magnitude. As the command signal takes on different magnitudes (within a predetermined range), the valves 22 and 25 are positioned correspondingly within a positional range between "full closed" to "full open".

As is known in the art, Class II servo devices are those which are moved from one position toward another only during those time intervals when an applied command signal exists. When the associated final element is to remain stationary, the command signal is simply removed (unlike in the case of Class I devices). The command signal is usually of fixed magnitude, and of one polarity or the other, so that the velocity of movement of the final element is constant and its direction corresponds to the command signal polarity. The extent of movement (to relocate the final element from an existing position to a different position) is determined by the length or duration of time in which the command signal exists. Engineers in the art sometimes call such signals "pulses" because the extent of movement of the final element is generally proportional to the time "width" of voltage "pulses" created as a command signal.

Class II servo devices have found widespread use in various control systems because the system computer need be configured to have essentially only a one-bit output port (plus a shared one-bit polarity port) for each "channel" and its associated final element. Thus, for a given number of single-bit output ports in the computer, many more Class II channels (compared to Class I channels) can be included within the system. The computer is loaded with an executive program which responds to the signals Td and Ta (for example), determines which final elements need to be repositioned and by what amounts, and then outputs to single-bit ports for those channels a command "pulse" which in width i.e., time duration, is proportional to the numerically computed amount of position change which needs to be accomplished.

There remains, however, a need to use Class I servo devices in many specific applications. Class I devices provide greater muscle and better precision. Indeed, both Class I and Class II devices preferably are intermixed in many composite control systems. Heretofore, the computer programming rationale has been different for servicing the two types of servo devices. This involves computing and changing continuously existing numerical signals, and (by use of DAC's) continuously existing analog command signals of settable magnitude—for the Class I devices. On the other hand, it involves creating on-off "pulses" of pre-computed time durations—but only when position changes are required—for servicing of Class II devices.

The present invention brings to the art methods and apparatus by which Class I servo devices may be served by a computer in the same fashion as if they were Class II servo devices. Thus, for a given computer with a given quantity of output ports, more Class I channels can be accommodated, each one requiring, in essence, only a single-bit output port. The computer programming rationale for the Class I channels may be made essentially the same as that for Class II channels, and when the two types are intermixed, the preparation of the exeutive program for the control computer is simplified, Indeed, a given channel for a given final element in a system can often be installed to utilize either a Class I or a Class II servo device (depending upon what physical units are on hand or available at the time) without any major changes in the computer program.

In FIG. 1, three single-bit output ports of the computer 35 are represented as closable relay contacts P1, P2, P3 (although in actual practice these may be solid state on-off switching devices such as transistors). These three ports are connected to the coils R1, R2, R3 of low voltage relays which control respective normally open contacts R1a, R2a, R3a. When the damper 15 (i.e., the final element of channel 1) is to be moved from an existing position to a different desired position displaced by a certain angle (determined numerically within the computer), the computer causes port contacts P1 (and thus relay contacts R1a) to be closed for a time interval which is proportional in duration to the desired angle of change. The contacts R1a, in turn, then apply a change signal $CH_1$ (of predetermined and fixed magnitude) to an electronic integrator $I_1$ during that time interval. Thus, the output of the intergrator— which is coupled directly or indirectly as the command signal $CS_1$ to the device SD1—will change in magnitude by an amount proportional to the duration.

Preferably, but optionally, the computer 35 is set up and organized so that one single-bit output port Pp is shared by several "pulse width" output ports (exemplified at P1, P2, P3) as a sense or polarity determinate. As illustrated in FIG. 1, a relay Rp is controlled by the port Pp so that its contacts Rp1 and Rp2 are respectively open and closed when the port signal is "low", but respectively closed and opened when that port signal is "high". A "low" port signal at Pp designates that a channel command signal is to be changed in an increasing magnitude sense; conversely, a "high" port signal designates that a channel command signal is to be changed in a decreasing magnitude sense. These contacts Rp1 and Rp2 thus couple either a zero volt or a 12 volt voltage via a conductor 42 to the input side of the relay contacts R1a, R2a and R3a. The contacts R2a and R3a feed change signals to integrators $I_2$ and $I_3$ to effect changes in the command signals $CS_2$ and $CS_3$ within second and third channels. When the contacts R1a, for example, are closed, then the change signal $CH_1$ is constituted as a voltage of zero volt magnitude or 12-volt magnitude depending upon whether the port Pp is "low" or "high" and thus whether the contacts Rp1 or Rp2 are closed. As explained later and as an example, the zero volt and 12 volt voltage levels are taken relative to a +6 volt reference, and thus they are, in effect, negative and positive in polarity.

As is per se known, the computer may measure off successive time spans of about three minutes each. During alternate spans, the port Pp is "low" or "high" because the computer causes the contacts, Pp to be open or closed. During the first and every other time span, those ones of the ports P1, P2, P3 associated with channels whose command signals need to be increased are made "high" and their respective input signals $CH_1$, $CH_2$ or $CH_3$ will be created with a zero volt level for respective time durations proportional to the required extents of change in magnitude. During the second and every other time span, those ones of the ports P1, P2, P3 associated with channels whose command signals are to be decreased are made high and their input signals $CH_1$, $Ch_2$ or $CH_3$ will be created with a 12 volt level with respective time durations proportional to the required extents of change in magnitude.

Figure 2:
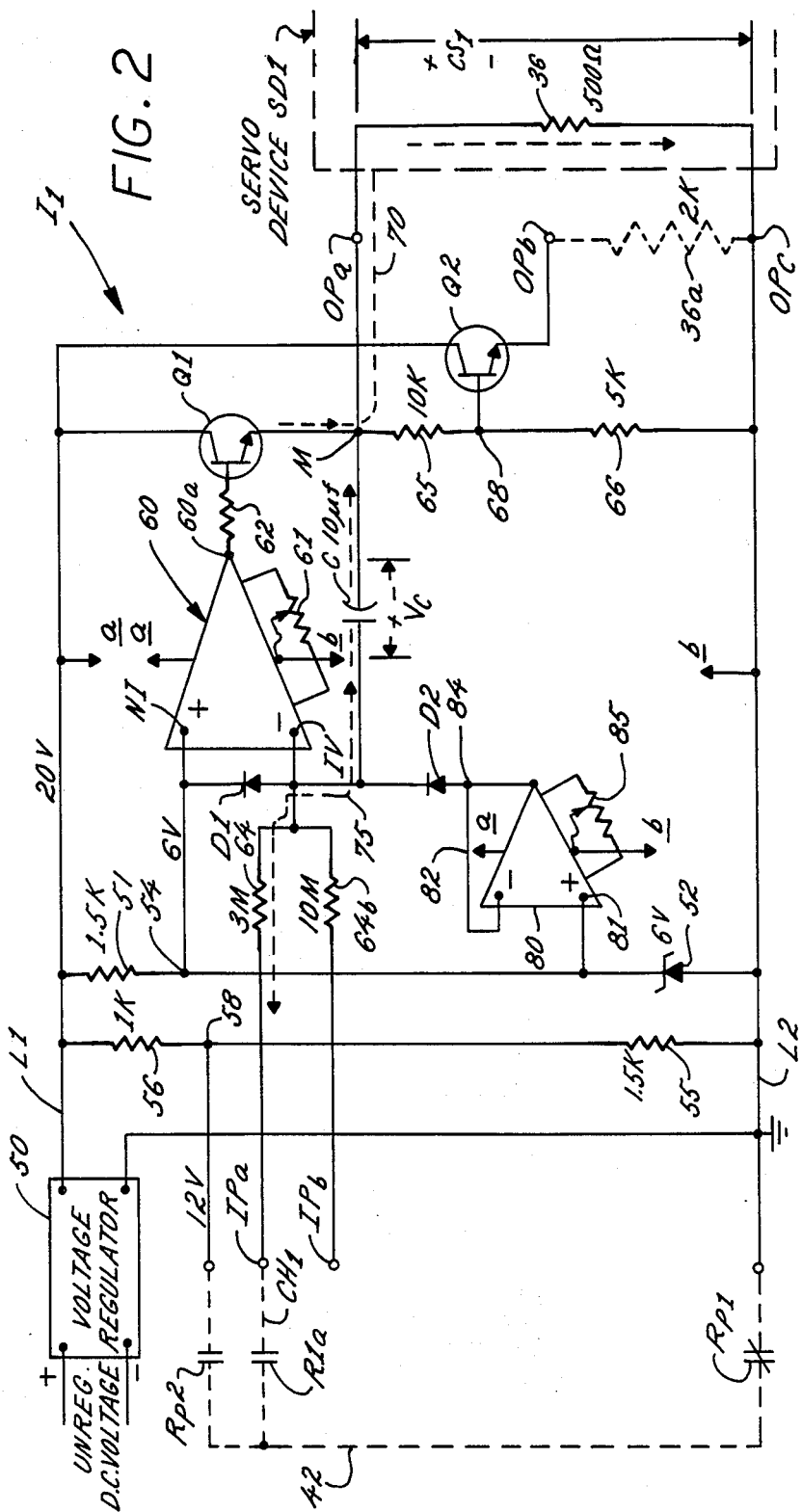
FIG. 2 is a schematic diagram of a preferred solid state electronic integrator employed in the practice of the invention.

The discussion of FIG. 2 which follows will make clear the organization and operation of the three essentially identical electronic integrators $I_1$, $I_2$, $I_3$ illustrated in block form by FIG. 1. For the present, it may be taken that when the change signal $CH_1$ exists, i.e., when the contacts R1a are closed, then the command signal $CS_1$ is increased or decreased at a predetermined rate expressible in volts per second by virtue of the integrating action in the integrator $I_1$. This, in turn, causes the servo device $SD_1$ to move the damper 15 from its existing position to a position displaced by an angle proportional to the change in the command signal $CS_1$. When the change signal $CH_1$ is removed (by opening the contacts R1a), the command signal is maintained at its then-existing magnitude. The second and third channels formed by the contacts R2a, R3a and the integrators $I_2$, $I_3$ taken with the devices SD2, SD3 function in the same way to bring about changes in the positions of the final elements illustrated as the valves 22 and 25.

As an overview of the control system, when the actual temperature in the office space 10 is above or below the desired temperature, the computer 35 is able to detect this by computing the magnitude of the "error", i.e., the difference and the polarity of the difference between the set point signal Td and the actual temperature signal Ta. No error will exist if the damper 15 and the valves 22 and 25 are residing in positions which cause the correct temperature to exist in the office space 10. If for any reason a temperature error arises (e.g., lights in the office 10 are turned on so actual temperature tends to increase above the set point), then the computer 35 "decides" which of the final elements should be adjusted, by what amounts, and in which directions. This is a complex function of the error and is determined by the executive program or algorithm which is loaded into the computer to establish the iterative computations that result in change signals being sent selectively to various ones of the channels. One known and commercially available computer, and programs of this nature, are available from American Auto-Matrix Incorporated of Export Pa.

Assume merely as an example that the integrator $I_1$ operates to change the command signal $CS_1$ at a rate of 0.2 volts per second, and that the servo device SD1 will move the damper 15 through an angle of 0.1 degrees for each 1.0 volt change in the signal $CS_1$. If the computer determines that the damper 15 should be moved from its presently-existing position counterclockwise through, say, sixteen degrees to a new position, the operating program of the computer will result in the port P1 being made "high" for eight seconds during a time span when the port Pp is "high". During that eight seconds, the contacts Rp2 and R1a will both be closed, and the change signal $CH_1$ will exist as 12 volts relative to ground. This causes the command signal $CS_1$ to ramp down by 1.6 volts, and the damper to swing sixteen degrees in a counterclockwise direction—so that more cool outside air is mixed with return air, drawn through the blower 11, and sent into the office space 10. This will tend to decrease the actual temperature from an excessive level back down to the set point represented by the signal Td. In the winter heating mode, the valve 22 in the second channel might also be correctively closed by a predetermined amount, and of course, there may be other channels and final elements (not shown) which could also be called upon to assist in restoring the actual temperature of the office space 10 to the desired set point.

The schematic circuit diagram in FIG. 2 illustrates the details of the integrator shown at $I_1$ in FIG. 1. The integrators $I_2$ and $I_3$ for the second and third channels are identical, except that they may share the regulated dc. source or supply voltage at the output of a common voltage regulator 50, this being desirable and convenient if several integrators $I_1$, $I_2$ ... $I_n$ are physically formed on a single printed circuit board to serve a plurality of channels. The regulator 50 produces a constant source voltage of +20 volts on a line L1 relative to a line L2 shown at common or ground (zero) potential. All specific voltage values, scale factors, rates and the like here mentioned are examples to facilitate description, and different values may be selected as a matter of choice.

In keeping with a preferred detail of the invention, a reference voltage is established at a level midway between two preselected values; in the present instance a resistor 51 and a Zener diode 52 are connected between lines L1, L2 as shown, with the diode being chosen to have a reverse breakdown voltage of six volts. A "reference voltage" constant at six volts relative to ground thus always exists at the node 54. To establish the two possible magnitudes, and the two possible "polarities" of the change signal $CH_1$, a voltage divider is formed by resistors 55 and 56 connected between lines L1, L2 and sized to make the voltage at the node 58 always equal to +12 volts. Thus, the voltage at node 58 is always six volts positive, and that at line L2 is always six volts negative, relative to the six volt "reference voltage" at node 54. These two voltage levels (at node 58 and at line L2) form the "source" for the change signal $CH_1$ which is applied, when it exists, to an input terminal Ipa. More particularly, the change signal $CH_1$ appears at terminal Ipa as (i) zero volts or (ii) +12 volts (relative to ground) when (i) the contacts Rp1 and R1a are both closed or (ii) when the contacts Rp2 and R1a are both closed—and in those two cases the change signal $CH_1$ forms an input which is respectively −6 volts or +6 volts relative to the reference voltage (+6 volts) at node 54.

If the contacts R1a are open, the terminal IPa is left floating and the change signal does not exist.

In accordance with the invention, a solid state electronic integrator is provided to produce an output voltage which changes in one sense or the other when input voltage of one polarity or the other (relative to a reference level) is applied, the rate of change of the output being linearly proportional to the magnitude of the input voltage. As illustrated in FIG. 2, the integrator $I_1$ is constituted in part by a high gain operational amplifier 60 characterized by exhibiting very high input impedance at its non-inverting and its inverting input terminals NI and IV. The amplifier 60 may, for example, be type CA3140 currently made and marketed in the United States by RCA. The source voltage is coupled to the amplifier from lines L1 and L2 as represented by the symbols a and b, with the usual offset potentiometer 61 connected as shown. A negative feedback path is established from the output 60a of the amplifier through a resistor 62 and a current-amplifying transistor Q1 and through a relatively large (10 microfarad) capacitor C which leads back to the inverting terminal IV. As is well known, the effective or net input signal to such an amplifier is constituted by the difference in the potentials at the terminals NI and IV, treating the former as positive and the latter as negative.

Without the negative feedback path, then if the input potentials at NI and IV are equal, the voltage at the terminal 60a will take on an "offset value" (e.g., +10 volts) which is determined by the adjustment of the offset potentiometer 61. Thus, when the net input to the operational amplifier 60 is zero, the predetermined or preadjusted offset voltage at 60a will establish a predetermined base-emitter bias in the transistor Q1 and this will cause the collector-emitter current to take on a predetermined magnitude inversely proportional to the effective load impedance in the emitter circuit. In practical effect, the transistor Q1 is an emitter follower, so that the voltage at a main integrator output terminal M is essentially equal to the voltage at the terminal 60a. If the potential at IV falls even very slightly below or rises very slightly above the potential at NI, then the net input to the amplifier 60 will become "positive" or "negative" and the voltage at 60a would (absent the feedback path) rise or fall, with high gain amplification, above or below the offset value. Absent the feedback path, the voltage at the integrator output terminal M would try to change correspondingly and by relatively large amounts.

In keeping with the present invention, the integrator $I_1$ includes means for applying a constant reference voltage to one input of the amplifier 60; for this purpose in the exemplary embodiment, the constant +6 volts at the node 54 is connected directly to the terminal NI.

The integrator $I_1$ further includes an input resistor 64 connected between the input terminal IPa and the terminal IV, such resistor thus being in series with the capacitor C between the input terminal IPa and the main output terminal M. Because the reference voltage at NI is constant, there is, in effect, only one input signal or voltage applied to the integrator, namely, the voltage which appears at the terminal IPa. This input voltage is "time integrated" as more fully explained below.

In carrying out the invention, means are provided to apply to the integrator an input voltage which exists when the change signal $CH_1$ exists, and which corresponds in polarity and magnitude (relative to the reference level) to that change signal. In the present instance, the change signal $CH_1$ is itself a voltage which is either +6 volts or −6 volts relative to the +6 volt reference level when the change signal exists, and thus such means take the form of a direct wire connection from the relay contacts R1a to the input terminal IPa. If the change signal were of a different character (such as a switchable current, light, or pneumatic pressure level signal), however, then a suitable transducer would be interposed ahead of the terminal IPa to convert the change signal into a bilevel voltage.

The integrator $I_1$ is completed by means for directly or indirectly coupling the output voltage from the main terminal M to an associated servo device. The direct coupling is shown in FIG. 2 as a connection from the terminal M to an output terminal OPa, the input resistance 36 of the servo device SD1 being connected between terminals OPa and OPc, the latter residing at common or ground potential. This direct connection is employed when the servo device input impedance 36 is low (say about 500 ohms) and the signal $CS_1$ applied thereto produces a current which can vary over a relatively wide range.

As treated below, however, a servo device having a high impedance 36a (and which is thus more responsive to applied voltage than injected current variations) may, as an alternative, be connected between output terminals OPb and OPc. In such case, the integrator output voltage at M is applied across a voltage divider formed by resistors 65, 66 with the node 68 tied to the base of an emitter-follower transistor Q2 having its collector supplied from the line L1. When the load impedance 36a is absent but the load impedance 36 is present, the elements 65, 66 and Q2 may be ignored; that is, they have essentially no effect on operation because the combined resistance (15 K ohms) of the voltage divider 65, 66 is so vastly higher than the resistance (e.g., 500 ohms) of the input impedance 36 that any current flowing through the voltage divider is negligible.

In considering the operation of the integrator, it must be understood that the capacitor C may carry a voltage Vc which makes the right plate either positive or negative relative to the left plate. The polarity as labeled in FIG. 2 will be taken arbitrarily as denoting a "positive" Vc, and the voltage Vc will be viewed as "negative" when the actual polarity is the opposite of that labeled. Assume that the change signal $CH_1$ does not exist, i.e., that the contacts R1a are open; ignore for the time being the diodes D1 and D2; and assume that in some fashion the capacitor voltage Vc has arrived at a value of +2 volts. The voltage at M (and the change signal $CS_1$) must in these circumstances be equal to +4 volts for otherwise the voltage at IV would be greater or less than +6 volts. Because the input impedance at IV is extremely high (e.g., $1.5 \times 10^{12}$ ohms), and current cannot flow through resistor 64 when contacts R1a are open, the capacitor in effect cannot charge or discharge. Thus, if the voltage at M rises to 4.05 volts or falls to 3.95 volts, the signal at IV would rise to 6.05 volts or fall to 5.95 volts—and the output at 60a would decrease or increase. This in turn would cause the collector-emitter path of transistor Q1 to become less or more conductive, and the current flow (illustrated by a dashed line at 70) through the load impedance 36 would fall or rise—thereby making the voltage $CS_1$ (and at M) fall or rise until restored back to the original 4.0 volt value. In effect, therefore, the integrator output at M and the change signal $CS_1$ applied to the servo device SD1 are held constant at the existing value whenever and so long as the change signal $CH_1$ does not exist.

Figure 3:
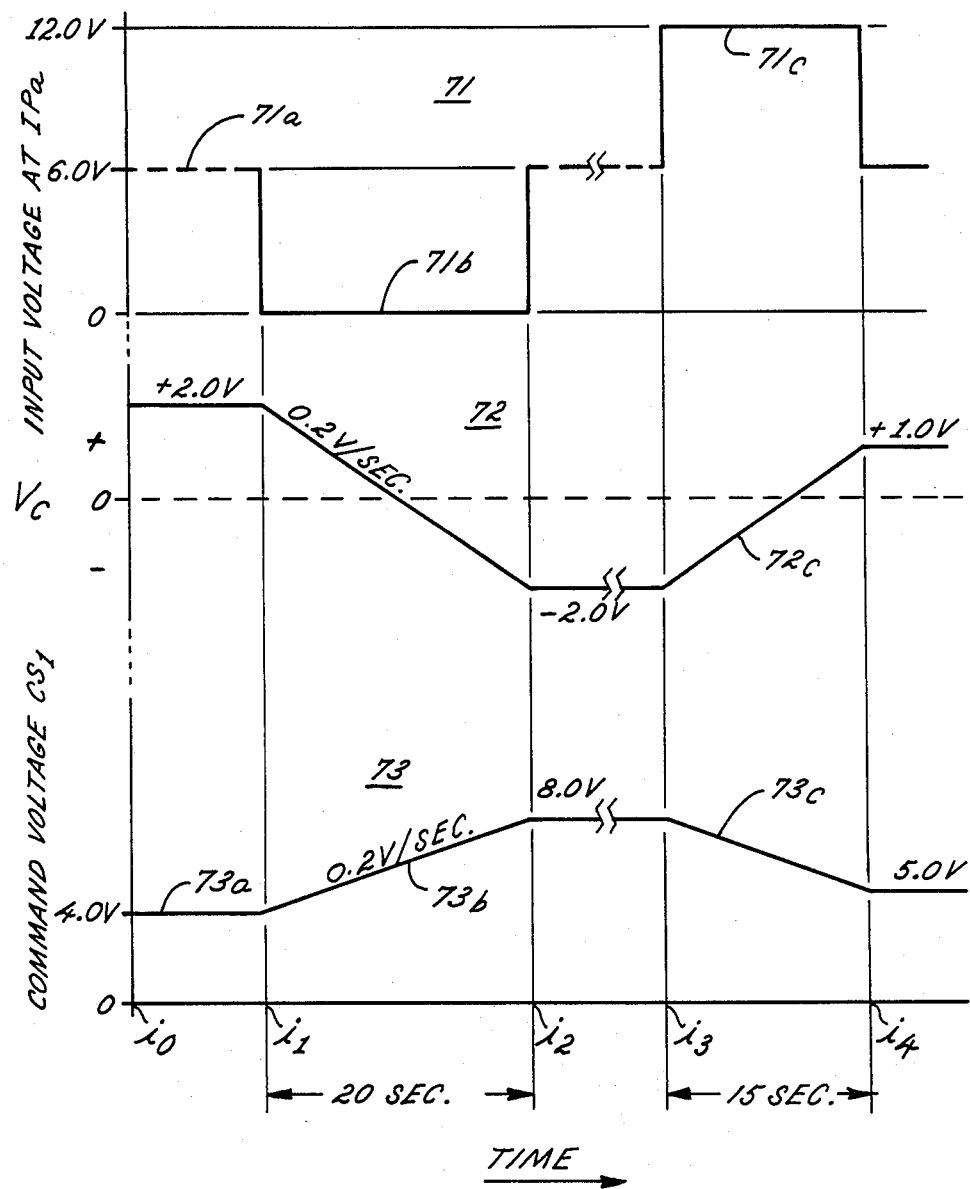
FIG. 3 is a graphic illustration of how certain signals vary with time during typical operation of the circuitry shown in FIG. 2.

FIG. 3 graphically illustrates at 71, 72, 73 the variations with time in the input voltage at terminal IPa, the capacitor voltage Vc and the command signal $CS_1$ during typical operations to effect changes in the latter. During the time from instant $i_o$ to $i_1$, the input voltage does not exist (because the terminal IPa is floating as represented by dashed lines at 71a). The input terminal IPa resides at six volts because (as explained above) the terminal IV is held at six volts by action of the amplifier 60 and no current can flow through the resistor 64 to create any voltage drop thereacross. In the interval from $i_o$ to $i_1$, the voltage Vc is shown at 72a as being +2.0 volts, and the command signal $CS_1$ is shown at 73a as being equal to 4.0 volts, in conformity with the foregoing example. The transistor Q1 is automatically controlled by the amplifier 60 to feed eight milliamperes through the 500-ohm load formed by the input impedance 36.

Next consider that the computer 35 in FIG. 1 decides that in order to correct a detected temperature error, the command signal $CS_1$ should be increased by four volts (up to 8.0 volts) so as to cause the damper 15 to move clockwise through a certain angle. If the scale factor for the servo device SD1 and its motor is one degree per 0.1 volt change or one degree per 0.2 milliampere change at the input impedance 36, then a four volt change in the command signal $CS_1$ will correspond to an angular change of 40 degrees in the position of the damper 15. To create the four volt incremental change in the command signal $CS_1$, the port P1 will be made "high" for twenty seconds within a time span when the port Pp is "low"; thus the contacts Rp1 and R1a will be simultaneously closed to make the input voltage at terminal IPa take on a value of zero volts during those twenty seconds as represented at 71b in FIG. 3.

Under these circumstances, and referring back to FIG. 2, the amplifier 60 will act to keep the terminal IV essentially at a six volt level (equal to that at the terminal NI). This means that current will flow from right to left through the resistor 64 to create a six volt drop thereacross, such current being supplied via the path 75 by discharge of the capacitor C, thereby decreasing the voltage Vc. Assuming that the resistor 64 is three megohms in value, the current must take on a constant value of 2.0 microamperes to create the constant six volt drop. From the known relation that the voltage across a capacitor changes at a rate proportional to the charging or discharging current but inversely proportional to capacitor size, one may see that the rate of change of the capacitor voltage in the present example is $$\frac{dVc}{dt} = \frac{I}{C} = \frac{2.0 \times 10^{-6}}{10 \times 10^{-6}} = 0.2 \text{ volts/sec.}$$

As shown in FIG. 3 at 72b, during the twenty seconds between instants $i_1$ and $i_2$ of the "pulse" at 71b, the capacitor voltage Vc falls linearly at a rate of 0.2 volts per second and reaches a value of −2 volts at instant $i_2$. But the amplifier 60 responds to any minute changes in voltage at terminal IV to keep the latter (within about a tenth of a millivolt, for example) at the reference level by adjusting the conductivity of the transistor Q1 and the voltage at M. In practical effect, the sum of the voltages $CS_1$ and Vc must always be six volts. This means that as the voltage Vc falls (see 72b) the voltage at M and the value of $CS_1$ must correspondingly rise—and at the same rate. This is illustrated at 73b in FIG. 3, where the voltage $CS_1$ rises from 4.0 to 8.0 volts during the twenty second interval ending at instant $i_2$. By virtue of the computer outputting a "pulse" of twenty seconds duration, the command signal is increased by a four volt increment and the damper 15 in FIG. 1 will shift through a corresponding angle. Between instants $i_2$ and $i_3$ (FIG. 3) when the input signal at IPa does not exist, the voltages Vc and $CS_1$ remain constant at their previously-acquired levels.

Consider next that at some later time a temperature error of opposite sense for some reason arises in the space 10 and that the computer determines that the command signal $CS_1$ should be increased by an increment of three volts to cause corrective repositioning of the damper 15. The computer contains program data which numerically represents the change rate or slope which results from operation of the integrator $I_1$, i.e., 0.2 volts per second according to the example given above. The computer computes that a "pulse" of fifteen seconds duration will be required in the change signal $CH_1$ and that the "polarity" of the signal must be made such as to cause a decrease rather than an increase in the command signal $CS_1$. The computer therefore makes ports Pp and P1 simultaneously "high" for fifteen seconds—so the input signal at terminal IPa (FIG. 2) becomes +12 volts for fifteen seconds between instants $i_3$ and $i_4$ labeled in FIG. 3 and as shown at 71c.

In these circumstances, current will flow from left to right through the input resistor 64 to produce a drop of six volts across that resistor. The terminal IPa is at +12 volts and the terminal IV always resides essentially at +6 volts, for the reasons explained above. The current through resistor 64 cannot flow into the terminal IV and thus flows from terminal IPa via the path 75 into the capacitor C—thereby charging the latter and increasing the voltage Vc. Again, the current magnitude is constant at two microamperes, so the voltage Vc increases at a rate of 0.2 volts per second as illustrated at 72c in FIG. 3. For the reasons set out above, the voltage at M and the $CS_1$ voltage must therefore decrease at a rate of 0.2 volts per second. Because the "pulse" at 71a endures for fifteen seconds, the $CS_1$ voltage decreases (as shown at 73c) from eight volts by an increment of three volts to end up with a value of five volts at instant $i_4$.

In review, it may be seen that the electronic integrator $I_1$ serves to produce an output voltage M which is directly or indirectly coupled to the servo device SD1 as the continuously-existing but settable analog command signal voltage $CS_1$. The change signal $CH_1$ and thus the input voltage at IPa are produced by the computer 35 and the associated relays with one polarity and a first predetermined magnitude (relative to the reference level at 54) when the command signal is to be changed in one sense; and they are produced with the opposite polarity and a second predetermined magnitude when the command signal is to be changed in the opposite sense. The command signal in each case changes at a predetermined time rate or slope which is (a) proportional to the magnitude of the input voltage relative to the reference level, but (b) inversely proportional to the product of the chosen values of ohms and farads for the input resistor 64 and the capacitor C. Because the time rate or slope may be entered numerically into the computer program, the computer need only make a "pulse" signal have a readily computed duration when a given incremental change is to be effected in the command signal. This is the same type of computation performed to service Class II servo devices, and thus the executive program for the computer may be made to follow essentially the same steps and rationale to serve both Class I and Class II channels.

It is not necessary that the above-mentioned first and second predetermined magnitudes for the input signal at IPa be equal. But if such equality is not adopted, the time rate or slope with which the command signal changes will be different for increases and decreases. It is advantageous to choose a certain reference level X and then to adopt first and second predetermined magnitudes of $Z_1 = X + Y$ and $Z_2 = X - Y$ for the input signal, so that an input signal with the first or second "polarity" relative the references identical in magnitude, that is, it becomes either $-Y$ or $+Y$. In the example of FIG. 2, the reference level X at node 54 is six volts and Y is six volts; thus, in that example, the first and second magnitudes of the input voltage relative to ground are chosen to be $Z_1 = 6 - 6 = 0$ and $Z_2 = 6 + 6 = 12$, so the input voltage relative to the reference is either $-6$ or $+6$. As another example, however, the reference X could be chosen as eight volts and Y chosen as five volts, so that the two predetermined magnitudes relative to ground would be chosen as $Z_1 = 8 + 5 = 13$ and $Z_2 = 8 - 5 = 3$. For either "polarity" of the input voltage relative to the reference, the input magnitude would be five volts and the time slopes would be equal. The preferred arrangement, exemplified in FIG. 2, is to pick a reference level X, make one "polarity" magnitude $Z_1$ be zero, and make the other "polarity" magnitude $Z_1$ to be $2X$. This requires only a single source (voltage divider 55, 56) to create a source of the $2X$ magnitude voltage; the zero magnitude voltage is simply ground potential.

The integrator $I_1$ may be provided with alternatively usable input terminals and/or alternatively usable output terminals in order that, once manufactured, it may be installed to operate with a selected one of a plurality of pre-established time slopes and/or to feed its output signal to a selected one of a plurality of different Class I servo devices which have different input impedances and which respond to command signals which vary over different ranges.

An alternative input terminal IPb is shown in FIG. 2 as leading through an input resistor 64b to the terminal IV. If the relay contacts R1a were connected to IPb (rather than IPa) then the ten megohm resistor 64b would operationally replace the three megohm resistor 64. The operation would be the same as described above, except now the capacitor charging or discharging current would become 0.6 microamperes (to create a six volt drop across the resistor 64b), and the output voltage time slope becomes $$\frac{dVc}{dt} = \frac{I}{C} = \frac{.6 \times 10^{-6}}{10 \times 10^{-6}} = 0.06 \text{ v/sec.}$$

Now, if a three volt incremental change in the command signal is to be effected, the duration of the change signal "pulse" will necessarily be measured off by the computer to be 50 seconds, i.e., 50 seconds $\times$ 0.06 volts/sec. = 3.0 volts. This time slope of 0.06 volts per second would be stored in the computer if the input terminal IPb is used instead of the terminal IPa.

Extending this principle, the relay contacts R1a may be connected to both of the terminal IPa and IPb so as to apply the input signal through resistors 64 and 64b in parallel. The effective input resistance formed by that parallel combination would then be 2.3 megohms and the time slope would be 0.26 volts per second. Thus, three specifically different time slopes may be obtained from the integrator $I_1$ depending upon which combination of input terminals is used.

Consider next that the servo device SD1 is disconnected from output terminals OPa and OPc but a different servo device of higher input impedance 36a (2000 ohms) is connected to the alternative output terminals OPb, OPc. Now as the capacitor voltage Vc changes over the span of $+6$ volts to $-6$ volts, and the main terminal M will vary in voltage from nominally zero to 12 volts (as before), but the voltage at divider node 68 will vary from zero to three volts; and by amplification in the transistor Q2, the command signal across the impedance 36a will vary from zero to about six volts. If the alternative Class I servo device is one that has a working command signal range of about two to five volts (a common range in industry), it may be accommodated simply by choosing the output terminals OPb, OPc. Conventional limiting means (not shown) may be added to restrict the range of variation of the command signal voltage at OPb to the span of two through five volts.

In summary, the flexibility of the integrator $I_1$ is illustrated by the following table:

| Input Terminal | Output Terminal | Command Signal Rate of Change | Command Signal Range |
|---|---|---|---|
| IPa | OPa-c* | 0.2 v/sec. | 2 to 10 volts |
|  | OPb-c Δ | 0.1 v/sec. | 2 to 5 volts |
| IPb | OPa-c* | 0.06 v/sec. | 2 to 10 volts |
|  | OPb-c Δ | 0.03 v/sec. | 2 to 5 volts |
| IPa & IPb | OPa-c* | 0.26 v/sec. | 2 to 10 volts |
|  | OPb-c Δ | 0.13 v/sec. | 2 to 5 volts |

*Assumes servo device input impedance nominally 500 ohms
Δ Assumed servo device input impedance nominally 2000 ohms The foregoing numbers are only approximate and may differ slightly in actual practice due to manufacturing tolerances in the values of the electrical elements such as the resistors 64, 64a the capacitor C and the Zener diode 52. Of course, by choosing other design values for such components, the numbers in the table may be changed to any specific values which may be desired.

In the early experience with the invention as thus far described, a problem of "wind-up" was encountered. That problem is advantageously overcome by provisions next to be treated. To understand the problem, suppose that through some error or malfunction, the change signal $CH_1$ with a given "polarity" is permitted to endure, or is repeatedly produced with successive durations, such that there is an attempt to drive the command signal $CS_1$ beyond the range (here, nominally two to ten volts) which the servo device SD1 can accommodate. The damper 15 would hit the limit of its clockwise or counterclockwise travel and could exert no further influence on the controlled temperature. Any damage to the servo device SD1 and/or the damper may be precluded by associating well-known means (not shown) with the transistor Q1 to limit or clamp the voltage span at M to the extremes of two volts and ten volts. But even with this, an unduly extended duration or durations of the change signal $CH_1$ will permit the capacitor C to charge or discharge even after the command signal has reached its limit and ceases to change. When later the change signal is applied with opposite "polarity", a long interval will be required to bring the capacitor voltage back to its controlling range and to start the damper 15 moving away from its limit position.

To take a hypothetical case, assume that the input voltage at IPa is +12 volts for a very long duration. The capacitor voltage Vc will reach six volts, thus bringing the voltage at M to zero volts (below which it cannot decrease). The voltage at 60a may be below 0.2 volts and the transistor Q1 will be essentially cut off. Now, the amplifier 60 is in a non-linear region and as the potential at IV rises further when the capacitor continues to charge but with a lesser charging current (because there are 12 volts applied at IPa across the series combination of resistor 64 and the capacitor C), the voltage at M does not decrease further. If the capacitor voltage Vc rises to say eight or ten volts, then later when the input signal at IPa is made zero volts, it will require a long time before the capacitor discharges back down to six volts and the command signal $CS_1$ begins to increase. The time delay so created is sometimes called "wind-up".

To alleviate wind-up, provision is made to clamp the amplifier input terminal IV to a maximum of about 6.3 volts, i.e., to a level just above that at which the amplifier 60 and the transistor Q1 become saturated or non-linear. For this purpose, a diode D1 is connected between terminals IV and NI and poled to conduct forward current from the former toward the latter. The diode D1 is chosen to have very low reverse leakage. By adjustment of the offset potentiometer 61, the terminal IV is made normally to reside at a voltage very slightly less than the voltage at terminal NI when the integrator is balanced and current through the capacitor C is essentially zero. Thus, diode D1 is indeed normally reversely biased to a small degree and normally it has no effect. But after the voltage Vc reaches about 6.3 volts and as current continues to flow from left to right through resistor 64, if saturation effects make the IV potential try to rise above 6.3 volts, the diode conducts forward current to the node 54—and such current does not enter the capacitor C to increase the voltage Vc above the 6.3 volt maximum. Severe "wind-up" is thus prevented.

The opposite condition is more difficult. Suppose a "negative" polarity change signal $CH_1$ (zero volts relative to ground) exists for an unreasonably long duration. The capacitor C will discharge to make Vc decrease and thus to make the command signal $CS_1$ increase. When the voltage Vc falls to about −6 volts, the output at M and the signal $CS_1$ will have reached about 12 volts. Now, however, the amplifier 60 and/or the transistor Q1 start to become non-linear as the capacitor C continues to discharge (attempting to drive the voltage Vc toward −12 volts), the output voltage at M does not further increase. Thus, the potential at IV would fall below 6.0 volts and the capacitor would continue to discharge to arrive at a voltage Vc of −8 or −10 volts. When later a change signal of 12 volts relative to ground is applied, a long time would be required to remove the "wind-up" and to resume control action by reducing the command signal $CS_1$.

To eliminate this wind-up effect, means are provided to clamp the amplifier input terminal IV to a minimum of about 5.8 volts, i.e., to a level just below that at which the amplifier 60 and/or transistor Q1 become saturated or non-linear. If, however, a diode clamp were connected directly between terminals NI and IV, but poled oppositely to the diode D1, then it would be biased very slightly in a forward direction during normal operation. Despite the fact that its forward conduction threshold would in normal operation not be exceeded, it might leak forward current from the reference source at node 54 and contribute spurious charging of the capacitor C. To clamp the terminal IV to a minimum of about 5.8 volts, therefore, a source voltage of slightly less than the reference level is created with high impedance isolation from the node 54 and the terminal NI, and a diode D2 is connected from that source to the terminal IV and poled to conduct forwardly from the former toward the latter. To establish this source voltage at about 5.9 volts an operational amplifier 80 is supplied with operating voltage as indicated at a and b. The non-inverting terminal 81 is connected to the reference voltage (six volts) at node 54 and a direct negative feedback connection is made at 82. This makes the output voltage at node 84 essentially equal to the reference except for the fact that the offset potentiometer 85 is adjusted so that the output is indeed slightly less than the reference voltage, namely, is about 5.9 volts. The diode D2 is thus reverse biased to a small degree unless and until the potential at IV falls below 5.9 volts. The diode D2 is chosen to have a low forward threshold voltage of about 0.2 or 0.3 volts. It will not conduct, therefore, until the potential at IV falls below about 5.7 volts, and the amplifier 60 or transistor Q1 has started to saturate. But when the diode D2 does conduct forwardly to send current from right to left through resistor 64, it clamps the terminal IV at about 5.7 volts and prevents the capacitor voltage Vc from decreasing below about −6.3 volts. The capacitor voltage Vc cannot "wind up" by becoming more negative.

RESUME

From the foregoing, it will be understood that the present invention brings to the art of control systems a method and apparatus for causing continuously existing analog voltage command signals to be changed by desired amounts and in desired directions in response to variable duration "pulse" type change signals. Thus, the commanded positions of several final elements actuated by Class I servo devices in some or all channels may be changed in the same fashion as if they were actuated by Class II servo devices. Class I and Class II servo devices may be intermixed within a composite control system and yet governed, essentially each from a single-bit output port of a computer, as if they were all of the Class II type.

These advantages are achieved by applying a "pulse" signal to the input of an electronic integrator whose output is directly or indirectly coupled as the analog voltage command signal to a Class I servo device. In the preferred details of its practice, the invention permits the rate of change of the command signal to be linear over a wide range and of the same value whether the command signal is being increased or decreased. This simplifies the executive programming of a central computer which forms a part of a multichannel control system, and the amounts of incremental change may be determined simply by making a pulse signal of a corresponding and essentially linearly related duration. Moreover, in the specifically preferred form, the invention alleviates the possibilities of "wind-up" and the delays in control system response which "wind-up" might otherwise cause.

What is claimed is:

1. The method of controllably changing and setting a continuously-existing analog command signal applied to a utilization device, said method comprising
   (1) creating an input voltage for time periods which in duration are proportional to the desired extent of change in the command signal; said input voltage being of one polarity and of a first predetermined magnitude, relative to a reference level, when the desired change is in one sense; and said input voltage being of the opposite polarity and of a second predetermined magnitude, relative to said reference level, when the desired change is in the opposite sense;
   (2) applying a reference voltage, which corresponds to said reference level to an electronic integrator,
   (3) applying said input voltage whenever such voltage exists, to the input of said integrator, and
   (4) coupling the output of said integrator to a utilization device as the analog command signal therefor.

2. The method defined by claim 1 further characterized in that said first and second predetermined magnitudes are substantially equal.

3. The method defined by claim 2 further characterized in that said reference voltage is +X volts, where X is a preselected number, and said input voltage is 0 volts or 2X volts respectively when it exists with one polarity or the opposite polarity relative to said reference voltage.

4. In a system for controlling a condition by varying a continuously-existing analog command signal applied to a utilization device which affects the condition, the combination comprising
   (1) means, including a programmed computer having an output port, for producing a change signal for a time duration proportional to desired amounts of change in a command signal; said change signal being of one polarity and of a first predetermined magnitude, relative to a reference level, when the desired change is in one sense; and said change signal being of the opposite polarity and of a second predetermined magnitude, relative to said reference level, when the desired change is in the opposite sense;
   (2) an electronic voltage integrator including means for producing an output voltage which changes at a rate proportional to the magnitude of, and in a direction corresponding to the polarity of, an input voltage—the magnitude and polarity of the input voltage being taken relative to a reference voltage applied to the integrator;
   (3a) means for applying to said integrator a reference voltage which corresponds to said reference level,
   (3b) means for applying to said integrator an input voltage which exists and corresponds in magnitude and polarity to said change signal; and
   (4) means for coupling the output voltage from said integrator as the command signal to a utilization device.

5. The combination set forth in claim 4 further characterized in that said change signal is a voltage and said means (3b) directly applies said change signal as an input voltage to said integrator.

6. The combination set forth in claim 4 further characterized in that said first and second predetermined magnitudes are substantially equal to one another and thus essentially identical, whereby the extent of change in said output voltage is related to the duration of existence of the change signal by essentially the same factor of proportionality both when the change signal is of said one polarity and when the change signal is of said opposite polarity.

7. The combination set forth in claim 6 further characterized in that
   (a) said means (3a) is constituted by means for applying a reference voltage of +X volts to said integrator, where X is a preselected number, and
   (b) said means (3b) is constituted by means for applying an input voltage of essentially 0 volts or +2X volts when said change signal exists with said one polarity or said opposite polarity, respectively.

8. The combination set forth in claim 7 and further including means for producing regulated dc. voltages of +X and +2X measured relative to a point (ground) of 0 volts, said means (3a) is constituted by means for applying said +X voltage as the reference voltage to said integrator, and said means (3b) is constituted by means for switching said 0 volts or said +2X volts to said integrator as the input voltage whenever said change signal exists respectively with said one polarity or said opposite polarity.

9. The combination set forth in claim 8 further characterized in that said change signal is 0 volts or 2X volts when it is produced by said means (1) respectively with said one polarity or said opposite polarity, and said means (3b) is constituted by means for applying said change signal to said integrator as the said input voltage.

10. The combination set forth in claim 4 wherein said integrator comprises
    (i) an operational amplifier having non-inverting and inverting input terminals,
    (ii) said reference voltage being applied to said non-inverting terminal,
    (iii) an input resistor having one end connected to said inverting terminal and its other end receiving said applied input voltage,
    (iv) a capacitor having one end connected to said inverting terminal and its other end constituting an output terminal, together with means for coupling the output of said amplifier to said output terminal,
    (v) means for coupling said output terminal to a utilization device and thereby creating a load resistance at the output terminal, and
    (vi) means for clamping the voltage existing at said inverting terminal to a limited range of departure from said reference voltage, thereby to preclude excessive windup of the voltage across said capacitor.

11. The combination set forth in claim 10 wherein said means (vi) comprises a first diode connected between said inverting and non-inverting terminals and poled to conduct forwardly only from the former toward the latter, means receiving said reference voltage and constituting a high impedance load thereon for creating an isolated source voltage slightly less than the reference level, and a second diode connected between said source voltage and said inverting terminal, said second diode being poled to conduct forward current from the source voltage toward said inverting terminal.

* * * * *